(12) United States Patent
Smith et al.

(10) Patent No.: US 6,834,151 B1
(45) Date of Patent: Dec. 21, 2004

(54) OPTICAL WAVEGUIDE AND FABRICATION METHOD

(75) Inventors: Peter G R Smith, Romsey (GB);
Graeme W Ross, Aberdeen (GB);
David C Hanna, Southampton (GB);
David P Shepherd, Southampton (GB);
Corin B E Gawith, Romford (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 09/762,805
(22) PCT Filed: Sep. 14, 1999
(86) PCT No.: PCT/GB99/03055
§ 371 (c)(1),
(2), (4) Date: Feb. 13, 2001
(87) PCT Pub. No.: WO00/16140
PCT Pub. Date: Mar. 23, 2000

(30) Foreign Application Priority Data

Sep. 14, 1998 (GB) ............................................. 9820024

(51) Int. Cl.[7] .............................. G02B 6/00; G02B 6/10
(52) U.S. Cl. .......................... 385/129; 385/122; 385/130
(58) Field of Search ......................... 385/122, 129–132; 438/22, 31, 455

(56) References Cited

U.S. PATENT DOCUMENTS

| | | | | |
|---|---|---|---|---|
| 4,893,907 A | * | 1/1990 | Mallinson ..................... 349/171 |
| 4,984,870 A | * | 1/1991 | Herbrechtsmeier et al. .. 385/143 |
| 5,122,852 A | | 6/1992 | Chang et al. .................. 357/30 |
| 5,155,791 A | * | 10/1992 | Hsiung ........................ 385/122 |
| 5,402,514 A | * | 3/1995 | Booth et al. ................. 385/130 |
| 5,656,181 A | | 8/1997 | Biasse et al. ................. 216/24 |
| 5,732,177 A | * | 3/1998 | Deacon et al. ............... 385/122 |
| 5,734,772 A | * | 3/1998 | Gopalan et al. ............. 385/122 |
| 5,756,263 A | * | 5/1998 | Gupta et al. ................. 430/317 |
| 5,804,461 A | * | 9/1998 | Beyea et al. ................... 438/45 |
| 5,875,053 A | * | 2/1999 | Webjorn et al. ............. 359/326 |
| 5,886,799 A | * | 3/1999 | Molteni et al. ............... 359/15 |
| 6,044,190 A | * | 3/2000 | Kashyap ..................... 385/123 |

(List continued on next page.)

FOREIGN PATENT DOCUMENTS

| EP | 0 585 565 | 3/1994 |
|---|---|---|
| EP | 0 598 395 | 5/1994 |

OTHER PUBLICATIONS

Understanding Fiber Optics, Jeff Hecht, 1993, Prentice Hall, third edition.*

Pelissier S et al.: "New Technique to Produce Buried Channel Waveguides in Glass" Optical Enginerring, US, Soc. of Photo–Optical Instrumentation Engineers. Bellingham, vol. 37, No. 4, pp. 1111–1114.

Ross G W et al.: "Generation of High–Power Blue Light in Periodically Poled LINBO3" Optics Letters, US, Optical Society of America, Washington, vol. 23, No. 3, pp. 171–173.

Yoo S J B et al.: "Quasi–Phase–Matched Second–Harmonic Generation in Algaas Waveguideswith Periodic Domain Inversion Archieved by Waffr–Bonding" Applied Physics Letters, US, American Institute of Physics. New Yourk, vol. 66, No. 25, pp. 3410–3412.

*Primary Examiner*—Michael C. Zarroli
(74) *Attorney, Agent, or Firm*—Nixon & Vanderhye P.C.

(57) ABSTRACT

An optical waveguide with at least a guiding lamina (10) of optical material bonded by direct interfacial bonding to a superstructure lamina (20) of optical material, in which regions of the guiding lamina have modified optical properties so as to define a light guiding path along the guiding lamina. In a particular example, a periodically poled $LiNbO_3$ planar waveguide is buried in $LiTaO_3$ by direct interfacial bonding and precision polishing techniques and used in an optical frequency doubling system.

11 Claims, 3 Drawing Sheets

U.S. PATENT DOCUMENTS

| | | | |
|---|---|---|---|
| 6,044,196 A | * 3/2000 | Winston et al. | 385/146 |
| 6,160,944 A | * 12/2000 | Payne et al. | 385/129 |
| 6,167,168 A | * 12/2000 | Dieckroeger et al. | 385/3 |
| 6,169,839 B1 | * 1/2001 | Johanson | 385/146 |
| 6,334,011 B1 | * 12/2001 | Galvanauskas et al. | 385/22 |
| 2001/0041040 A1 | * 11/2001 | McCallion et al. | 385/129 |

* cited by examiner

OPTICAL WAVEGUIDE AND FABRICATION METHOD

This application is the US national phase of International Application No. PCT/GB99/03055, filed 14 Sep. 1999, which designated the U.S., the entire content of which is hereby incorporated by reference.

BACKGROUND OF THE INVENTION

1. Field of the Invention

This invention relates to the fabrication of optical waveguides.

2. Discussion of Prior Art

One known technique for fabricating optical waveguides is the so-called direct bonding (or direct interfacial bonding) technique.

Direct bonding (DB) is a fabrication technique that uses the Van der Waals forces present when two atomically flat bodies approach each other to create a bond between two bodies. If the bodies are laminas of optical material having appropriate refractive indices, the material laminas can be joined to form waveguiding boundaries.

In one established way to form such a bond the surfaces of two pieces of optical material are polished so as to be very flat (i.e. substantially flat at atomic dimensions). The crystalline structures of the two polished faces are preferably aligned with each other and the polished faces are pressed together. A heat treatment can be useful to encourage a pyroelectric effect and the exchange of electrons between the two surfaces. This gives rise to an electrostatic attraction between the two surfaces, which tends to expel any remaining air or liquid from between the two surfaces. A final annealing step can improve the bond strength further.

A DB bond can be formed irrespective of the lattice constants and orientation of the bodies involved and causes no degradation on the crystalline microstructure or either material. By contacting surfaces in such a non-destructive way, DB preserves the bulk characteristics of each bonded material whilst avoiding possible problems caused by lattice defects, such as increased propagation loss and optical damage.

EP-0598395 describes forming an optical waveguide device by direct bonding of a support substrate and a low refractive index layer on a glass substrate, then etching the glass substrate.

SUMMARY OF THE INVENTION

This invention provides an optical waveguide comprising at least a guiding lamina of optical material bonded by direct interfacial bonding to a superstructure lamina of optical material, in which regions of the guiding lamina have modified optical properties so as to define a light guiding path along the guiding lamina characterised in that the waveguide further comprises a second superstructure lamina bonded by direct interfacial bonding to the guiding lamina.

The invention recognises and addresses the shortcomings of previous proposals for the use of DB structures in optical waveguides. In such previous proposals, a flat lamina of a material having a raised refractive index (forming a waveguide "core") is bonded between two laminas of material having a lower refractive index (forming a waveguide "superstructure"). While this provided a bulk guiding structure, the large lateral dimension of the flat "core" lamina meant that the arrangement was not useful for many waveguiding applications or as a single-mode waveguide.

In contrast, in the invention, regions of the core lamina have modified optical properties so as to define a light guiding path along the core lamina. This can give a greatly increased flexibility of use and allow the guiding path to be much more tightly defined than in previous arrangements.

Although the method is suitable for use with many types of materials, such as glasses, it is preferred that the core lamina is a ferroelectric material, allowing the modified regions to be generated by electrical poling.

A particularly useful ferroelectric material having well-studied optical and electrical properties, is periodically poled lithium niobate (PPLN). PPLN combines a large non-linear coefficient, a widely-controllable phase-matching wavelength, and zero walk-off characteristics that make it an ideal material to achieve quasi-phase matching (QPM) for non-linear frequency conversion. With recent improvements in the efficiency of second-harmonic generation (SHG) within PPLN substrates, it is recognised in the present invention that the use of such a material in an appropriate waveguide geometry formed using the invention can provide a realisation of various compact non-linear devices based on harmonic or parametric generation.

The present method is particularly appropriate for use with PPLN, and has several advantages over other techniques for fabricating waveguides using PPLN such as the so-called "annealed proton exchange" technique and the "titanium indiffusion" technique, both of which act on a single PPLN crystal and modify the crystal near the surface in order to create regions of higher refractive index for optical confinement.

Previous experiments investigating the bonding characteristics of PPLN have been directed towards fabricating thick multi-laminated stacks of the material for a large physical aperture, and thus high power applications. In contrast, creating a sufficiently thin lamina of PPLN increases the average pump intensity applied to the domain-inverted structure via optical confinement, and thus allows efficient SHG even at low pump powers. Fabrication of such a device is obtainable by bonding PPLN onto a suitable substrate before precision polishing down to waveguide dimensions, a method which has already been demonstrated in the production of $LiNbO_3$ planar waveguides for electro-optic applications. One of the primary attractions offered by this technique is that the non-linearity and domain characteristics of the PPLN structure after bonding should remain unchanged from the bulk material—a combination that annealed proton exchange and Ti indiffusion methods are close to achieving, but not yet at their full theoretical efficiencies. A further advantage of the present method is the extra flexibility available when designing devices, as combinations of multiple laminas with different material properties are now possible.

Viewed from a second aspect this invention provides a method of fabricating an optical waveguide, the method comprising the steps of:

(a) bonding, by direct interfacial bonding, a guiding lamina of optical material to a superstructure lamina of optical material;

(b) before, during or after step (a), modifying optical properties of regions of the guiding lamina so as to define a light guiding path along the guiding lamina; characterised in that the method further comprises the steps of:

(c) after steps (a) and (b), removing material from the guiding lamina to reduce the thickness of the guiding lamina (10); and (d) after step (c), bonding, by direct interfacial bonding, a further superstructure lamina (20) to the guiding lamina.

BRIEF DESCRIPTION OF THE DRAWINGS

Embodiments of the inventions will now be described, by way of example only, with reference to the accompanying drawings in which.

DETAILED DISCUSSION OF EMBODIMENTS

In the following description, preparation and use of an example waveguide as a second harmonic generator will first be described with reference to FIGS. 1 to 3. Then, other waveguides also forming embodiments of the invention will be described.

Figure 1:
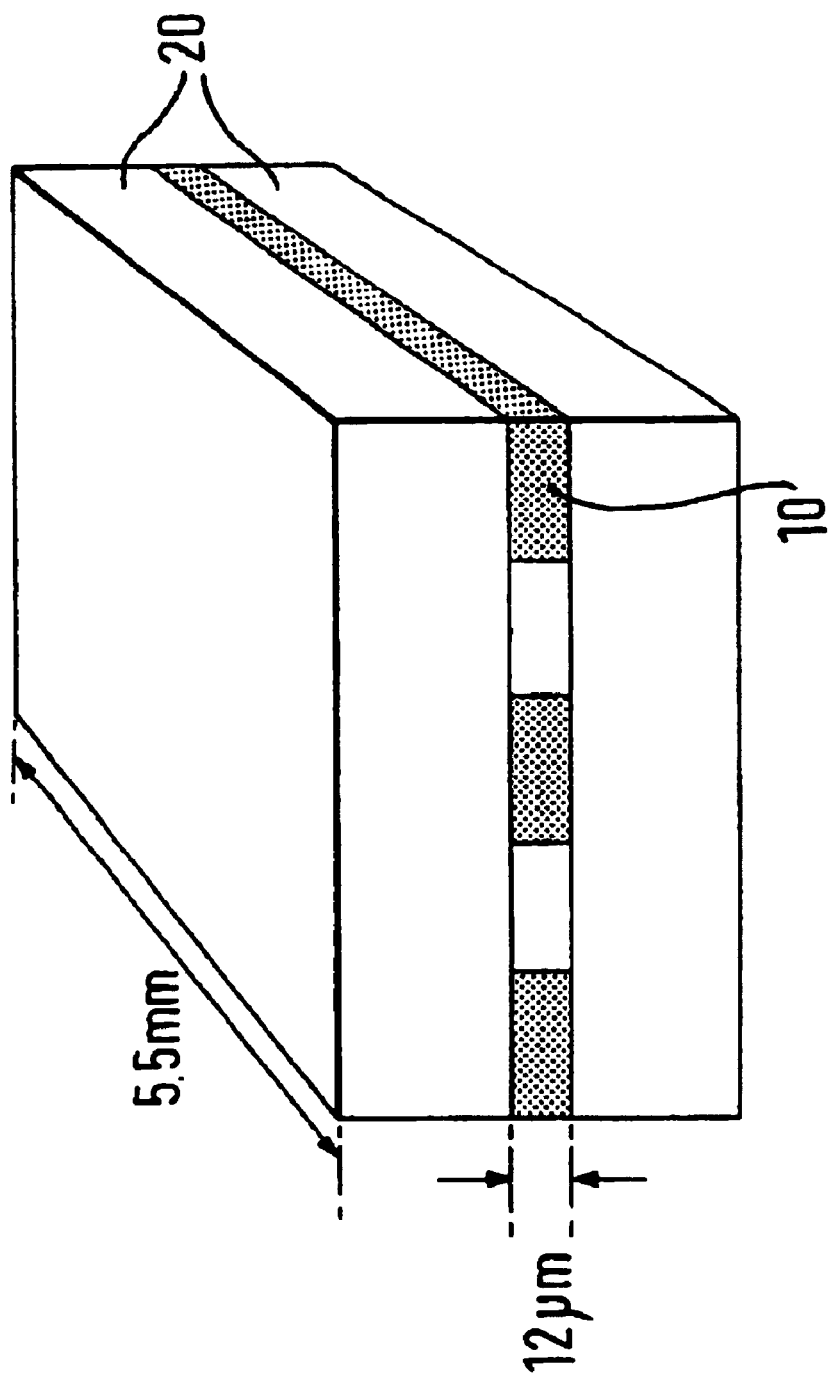
FIG. 1 is a schematic diagram of a waveguide formed using a lamina of PPLN bonded between two laminas of lithium tantalate.

FIG. 1 schematically illustrates a waveguide formed as a directly bonded sandwich of a lamina 10 of PPLN between two laminas 20 of lithium tantalate ($LiTaO_3$).

The PPLN lamina 10 is in the form of a PPLN grating, in that the lithium niobate ($LiNbO_3$) material is poled in a periodic, "striped" arrangement. These "stripes" of alternately poled regions in the lithium niobate material are shown schematically in FIG. 1 as alternate black and white stripes, although it will be appreciated that in reality the periodic poling structure would almost certainly not be detectable by the human eye.

Production of the PPLN grating began with a 0.5-mm-thick single domain z-cut $LiNbO_3$ sample of about 15 mm×15 mm surface area. A photoresist pattern was created on the z-face of the crystal by photolithography. This formed regions on the crystal surface which are covered by an electrical insulator, and regions which are not so covered. A liquid electrode was then applied to the partially insulated surface, and domain inversion in the z-axis was performed at room temperature by the application of a single high voltage pulse of ~11 kV through the liquid electrode. This resulted in three 5.5-mm-long PPLN gratings, positioned in the centre of the $LiNbO_3$ sample at 1 mm intervals. Grating periods of 6.58, 6.50, and 6.38 μm were created, the first two of which are suitable for frequency doubling of a Nd:YAG laser operating at 1064 nm.

$LiTaO_3$ was chosen as a suitable material for both the substrate and superstructure laminas as it combines thermal characteristics that are a good match for $LiNbO_3$, an important pre-requisite when annealing bonds at high temperatures, together with a refractive index lower than that of $LiNbO_3$.

Each $LiTaO_3$ substrate was 0.5-mm-thick and shaped relative to the PPLN sample to provide a bonding area of about 12 mm×10 mm between the two optically flat surfaces. To form a bond between an $LiTaO_3$ substrate and the PPLN grating, the two materials were first cleaned, then a mixture of $H_2O_2$—$NH_4OH$—$H_2O$ (1:1:6) was applied to both materials, followed by several minutes of rinsing in de-ionised water, in order to render their surfaces hydrophilic.

Contacting of the PPLN and $LiTaO_3$ laminas was performed at room temperature with both samples aligned along the same crystalline orientation. A heat treatment of 120° C. immediately followed crystal contact to induce the pyroelectric effect at the DB interface. The resultant electrostatic attraction forced any excess air or liquid from between the two surfaces, whilst bringing them close enough to encourage the formation of hydrogen bonds. This effect was evident by the elimination of most contact fringes at the crystal interface. Annealing of the bonded sample at 320° C. for 6 hours provided a bond strength sufficient for further machining, and the PPLN region was lapped down to obtain a waveguiding lamina of 12-μm-thickness.

The second superstructure lamina of $LiTaO_3$ was then added as above. The final DB structure included bonded interfaces of about 12 mm×10 mm above and below the PPLN core, although evidence of small unbonded regions at the edges of the sample were detected by the presence of optical fringes. The unnecessary material surrounding the gratings was later removed using dicing equipment and the waveguide end-faces were then polished to a parallel optical finish. Dimensions of the resulting buried PPLN planar structure are given schematically in FIG. 1.

An upper limit for the value of the propagation loss of the waveguide structure was found by measuring the transmission of a 1064 nm laser beam when end-launched into the waveguide. It was noted that the transmission changed between the PPLN and unpoled $LiNbO_3$ sections, although this was not due to SHG. The launch from a microscope objective was empirically optimised for each region and maximum transmissions of 81% were found at the edges of the poled regions (where the best SHG occurred) and throughout the unpoled $LiNbO_3$ sections, whilst 65% transmission was obtained at the centre of the PPLN region. Thus, taking into account the 5.5-mm-length of the grating, an upper-limit to the propagation loss in each section can be placed as 1.7 dB cm$^{-1}$ for the PPLN edges and unpoled $LiNbO_3$ regions, and 3.4 dB cm$^{-1}$ for the central PPLN region. In reality, these transmission figures also include a certain loss due to non-perfect launching and so the propagation losses are likely to be much lower. Indeed, DB waveguides in garnets and glasses for laser applications have shown losses of ~0.5 dB cm$^{-1}$ and less.

To test the non-linear properties of the buried PPLN structure, the SHG characteristics of the 6.50 μm grating were investigated. This grating, which occupied the middle section of the PPLN waveguide, successfully suppressed the photorefractive effect at its phase-matching temperature of 174.1° C. and so was chosen for further analysis. The 1064 nm pump source was a cw diode-pumped Nd:YAG laser 30 operating with multi-axial modes. The linear polarisation state was rotated with a half-wave plate (not illustrated) to be parallel with the z-axis of the PPLN in order to access the material's largest non-linear coefficient ($d_{33}$). Focusing of the pump radiation for launching into the waveguide was performed using a combination of microscope objectives and cylindrical lenses, as shown in FIG. 2. In particular, the initially circular pump beam was passed through a spherical collimating lens 40 and into a ×2.4 cylindrical-lens telescope 50 to produce widening in the non-guided direction before being focused onto a poled region of the PPLN waveguide device 70 of FIG. 1 by a ×10 microscope objective 60. Such a combination of optics was chosen to provide good launch efficiency whilst helping to reduce divergence in the horizontal unguided plane. This resulted in a pump source with a line focus and measured spot sizes of 4±1 µm in the guided direction and 11±1 µm in the non-guided direction.

It should be noted that focusing to a waist in the non-guided plane at the input face is not necessarily the optimum condition for maximum SHG efficiency. However, it was used in this demonstration due to the simplicity of having one ×10 objective as the focusing element instead of a more complicated cylindrical-lens launching arrangement. Also, for this initial demonstration, both the input and output end-faces of the waveguide were polished but left uncoated, leading to 14% reflection losses at each face.

The waveguide device 70 was placed in an oven 80 to maintain the waveguide's temperature at the phase-matching temperature of 174.1° C.

A second ×10 microscope objective 90 was used to collect the transmitted light from the waveguide. This was followed by an infra-red filter 100 to block any throughput from the pump beams, allowing the generated green output of the PPLN to be measured by an optical power meter. For 204 mW of launched pump power ($\lambda$=1064 nm), a second-harmonic (SH) power of 1.8 mW ($\lambda$=532 nm) was generated internal to the crystal. FIG. 3 shows a plot of the square root of the SH power versus launched pump power, revealing a quadratic dependence between the measured values.

Figure 2:
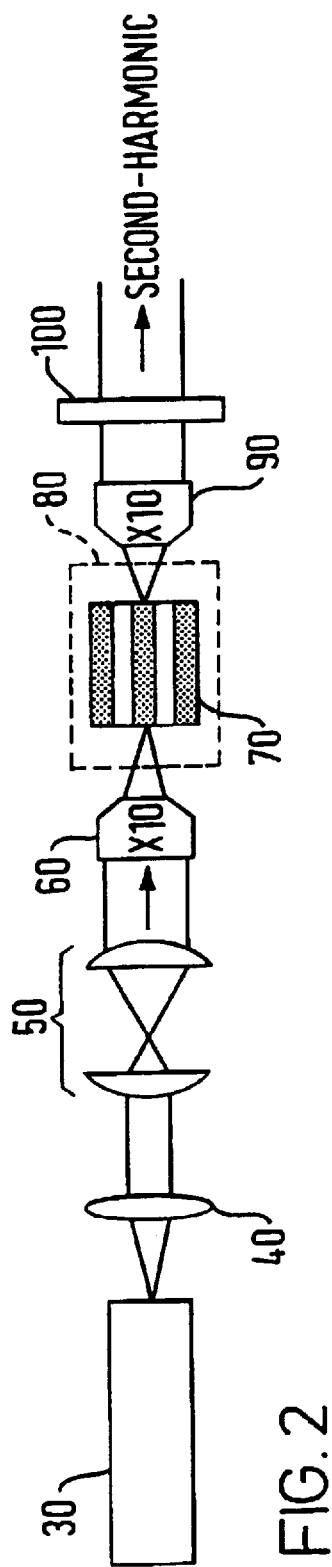
FIG. 2 schematically illustrates a second harmonic generator using the waveguide of FIG. 1.
Figure 3:
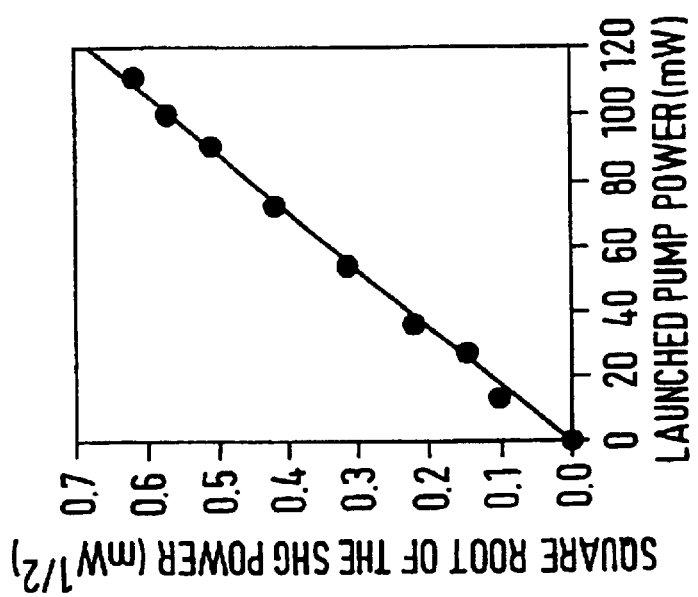
FIG. 3 is a graph relating the square root of second harmonic power to launch power for the apparatus of FIG. 2.

It should of course be noted that the system of FIG. 2 is a specific example of an optical parametric device. The waveguide would be suitable for use in many other such devices.

Due to the unusual pumping geometry used while testing the PPLN waveguide, any calculation of the SHG efficiency from the device would be complicated. Instead, the most interesting comparison to make is with a calculation of the SH power expected from a similar length of bulk PPLN with optimised focusing in the centre of the grating. Assuming a non-linear coefficient of 16 pm $V^{-1}$ (a value consistent with results in bulk experiments using similarly produced PPLN gratings), it is possible to produce a SH output power of 1.3 mW in the bulk material—a lower result than the 1.8 mW obtained from the direct-bonded waveguide. Therefore, it would appear that even with non-optimum focusing and only one guided dimension, the buried PPLN device shows an improved SHG efficiency over the bulk material.

Characterisation of the output modes of the PPLN waveguide was performed by the use of a video camera and PC-based evaluation software. Surprisingly, it was observed that both the 1064 nm throughput and the SH generated 532 nm radiation from the PPLN waveguide were in the fundamental spatial mode, an unexpected result for a 12-µm-thick guide with such a large index difference ($\Delta n_e \approx 1\%$). Indeed, only by using a deliberately poor launch was it possible to excite anything other than the fundamental mode at 1064 nm. Even more unusual was the result that the 1064 nm throughput from the unpoled LiNbO$_3$ region within the same buried structure was multi-spatial-mode in nature. This clear difference in the mode properties, combined with the apparently different transmissions described earlier, suggests that the index profile of the PPLN section is different to that of the unpoled LiNbO$_3$ section.

In summary, for the first embodiment of the invention these experiments demonstrate the successful prototype fabrication of a 12-µm-thick, 5.5-mm-long, symmetrical PPLN waveguide buried in LiNbO$_3$ by DB. Using the 6.50-µm-period PPLN grating at an elevated temperature of 174° C., an efficient quasi-phase-matched frequency doubling of the 1064 nm line of a cw diode-pumped Nd:YAG laser has been demonstrated. For 204 mW of fundamental pump power, nearly 2 mW of green power was generated at an output wavelength of 532 nm. This result was obtained with non-optimum focusing conditions but remains higher than the theoretical expectation for a similar length of bulk material. The waveguiding properties were shown to be different in the PPLN, and unpoled LiNbO$_3$ regions of the sample, with the PPLN section showing a surprising single-spatial-mode behaviour. These results suggest that the production of longer buried waveguides, potentially incorporating channel structures, should lead to highly-efficient non-linear devices. With a full characterisation of propagation losses and effects of strain upon the index profile, the DB technique should allow extra freedom, and hence new device possibilities, in the choice of non-linear waveguiding structures.

The techniques described above are not limited to PPLN, but can be applied to any optically useful poled ferroelectric material such as LiTaO$_3$, doped LiNbO$_3$ (e.g. Mg-, Ti- or rare earth doped), strontium barium niobate, barium titanate, potassium titanyl phosphate and its isomorphs, polar semiconductors such as gallium arsenide and so on.

The poling of the PPLN can be carried out before, during, between and/or after the bonding stages. If the poling is carried out other than before the bonding stages, and a ferroelectric material is used for the other laminas, then those other laminas can also end up being poled. This may change the guiding properties of the waveguide but does not prevent operation as a waveguide. Indeed, the bonding properties may even be improved by this measure (or by poling the other laminas separately).

In the example above, a poled area is used to define a waveguiding path along the lamina 10, but with other substrates it may be found that an unpoled lamina offers a more appropriate path.

It is not necessary to surround the lamina 10 by two other laminas 20. Instead, one lamina 20 could be used, to form an "open sandwich" structure of just two laminas. In this case the symmetry of the structure would be altered and the guided mode(s) would probably be different, but operation as a waveguide would still be possible.

The thickness of the lamina 10 can be altered, again altering the nature of the guided mode(s) in the waveguide. In this way, a single mode structure can be fabricated.

Figure 4:
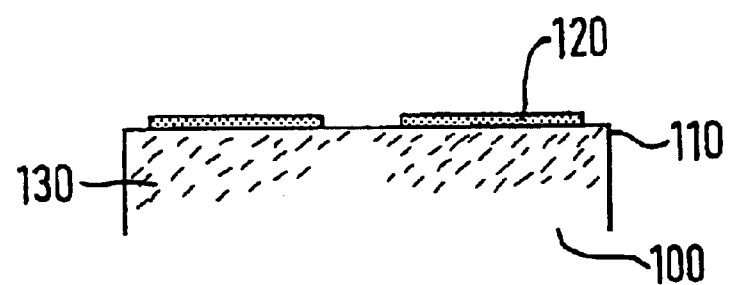
FIGS. 4 and 5 are schematic diagrams illustrating the fabrication of a waveguide according to an embodiment of the invention using an indiffusion technique.
Figure 5:
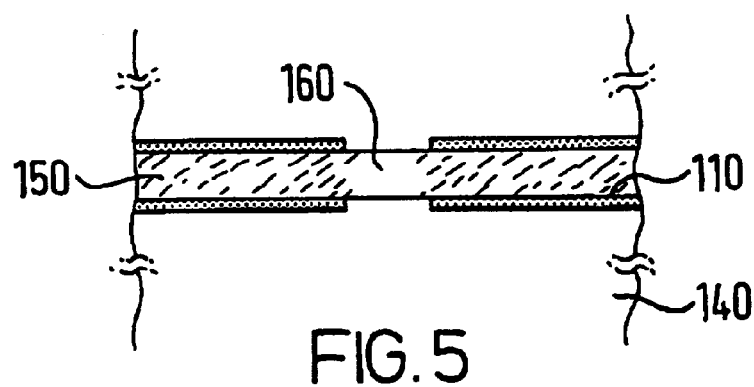

Referring now to FIGS. 4 and 5, a second embodiment using an indiffusion technique to define a waveguide path will be described.

In this second embodiment, a piece of PPLN 100 is made by the conventional electrical poling method. The piece 100 might be, for example, 500 µm thick and several mm in the other two dimensions. One face 110 of the piece 100 is patterned with magnesium oxide (using a process of photolithography and vacuum evaporation or sputtering). The magnesium oxide lamina is less than about 400 nm thick, and defines (by the parts not covered by the lamina) a waveguide path along the piece 100. The piece 100 is then heated to a temperature of between about 600° C. and about 1200° C. This causes the magnesium oxide material to diffuse in and, in the indiffused regions 130, locally lower the refractive index.

The piece 100 is then bonded, by a direct bonding process applied to the face 110, to a LiTaO$_3$ substrate (140, FIG. 5), before being polished down to a substantially uniform thickness of between, say, about 4 µm and about 40 µm.

A further magnesium oxide pattern is then deposited on the exposed (newly polished) face of the piece 100, and the heat treatment repeated. This causes the magnesium oxide to indiffuse from the other side, to match the indiffusion from the face 110. Regions 150 of reduced refractive index are thus formed, defining a waveguiding core 160.

This technique, or a complementary out-diffusion technique, is applicable not only to other ferroelectric materials (for examples, see above), but also to any substrates whose refractive index can be altered by an indiffusion technique, such as various glasses, polymers and other crystals. The common advantage shared between all applications of this technique is that the guiding region 160 can be formed of unadulterated material.

Similarly, in all of the embodiments, the "superstructure" laminas can be of various materials such as unpoled LiNbO$_3$ or other suitable materials from the lists above.

Figure 6:
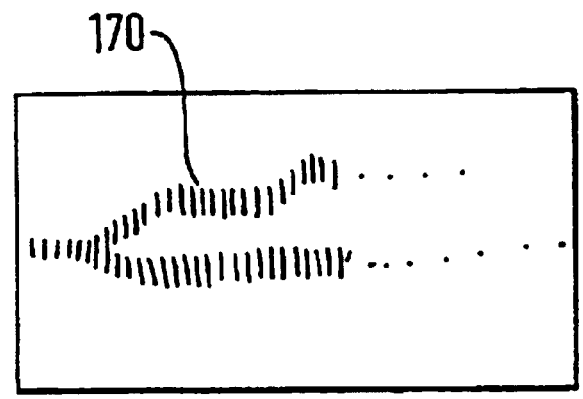
FIG. 6 schematically illustrates a waveguide according to a further embodiment of the invention.

It is possible to fabricate curved waveguide paths using the above techniques. In the case of the first embodiment, a poling pattern similar to that shown schematically in FIG. 6 can be used, where a series of poled regions form a track 170 which bifurcates as a signal splitter. In the case of LiNbO$_3$ there is a preferred poling direction resulting form the crystal structure, but the arrangement of FIG. 6 gets around this restriction to form curved or varying-direction paths using multiple displaced poled stripes.

PUBLICATION REFERENCES

[1] J A Armstrong, N Bloembergen, J Ducuing, and P S Pershan, Phys. Rev. 125. 1918 (1962)
[2] G W Ross, M Pollnau, P G R Smith, W A Clarkson, P Britton, and D C Hanna, Opt. Lett. 23. 171 (1998)
[3] K Kintaka, M Fujimura, T Suhara, and H Nishihara, J. Lightwave Tech. 14. 462 (1996)
[4] M A Arbore and M M Fejer, Opt. Lett. 22. 151 (1997)
[5] P Baldi, M P De Micheli, K E Hadi, S Nouh, A C Cino, P Aschieri, and D B Ostrowsky, Opt. Eng. 37. 1193 (1998)
[6] J Amin, V Pruneri, J Webjorn, P St J Russell, D C Hanna, and J S Wilkinson, Opt. Comm. 135. 41 (1997)
[7] J Haisma, B A C M Spierings, U K P Biermann, and A A van Gorkum, Appl. Opt. 33. 1154 (1994)
[8] K Eda, M Sugimoto, and Y Tomita, Appl. Phys. Lett. 66. 827 (1994)
[9] M J Missey, V Dominic, L E Myers, and R C Eckardt, Opt. Lett. 23. 664 (1998)
[10] Y Tomita, M Sugimoto, and K Eda, Appl. Phys. Lett. 66. 1484 (1995)
[11] J Haisma, T M Michielsen, and F J H M van der Kruis, Phillips J. Res. 49. 65 (1995)
[12] C T A Brown, C L Bonner, T J Warburton, D P Shepherd, A C Tropper, D C Hanna, and H E Meissner, Appl. Phys. Lett. 71. 1139 (1997)
[13] G A C M Spierings, J Haisma, and T M Michielsen, Phillips J. Res. 49. 47 (1995)
[14] G D Boyd and D G Kleinmann, J. Appl. Phys. 39. 3597 (1968)

What is claimed is:

1. An optical waveguide comprising:
    a guiding lamina of optical material bonded by direct interfacial bonding to a superstructure lamina of optical material, and
    a second superstructure lamina bonded by direct interfacial bonding to the guiding lamina, the guiding lamina defining a light guiding path, wherein said path is formed of an unmodified optical region of the guiding lamina and a modified optical region defines a boundary of said path.
2. A waveguide according to claim 1, in which the guiding lamina is formed of a ferroelectric material.
3. A waveguide according to claim 2, in which the guiding lamina is formed of lithium niobate.
4. A waveguide according to claim 2, in which the modified regions are electrically poled regions of the guiding lamina.
5. A waveguide according to claim 4, in which the modified regions are spatially periodically electrically poled regions of the guiding lamina.
6. A waveguide according to claim 1, in which the modified regions are formed by indiffusion of one or more dopant materials into the guiding lamina.
7. A waveguide according to claim 1, in which at least part of the modified regions form the light-guiding path.
8. An optical parametric device comprising:
    a waveguide according to claim 1; and
    means for launching an input optical signal into the waveguide.
9. A device according to claim 8, comprising:
    an output filter for filtering light emerging from the waveguide to reduce components having the wavelength of the input optical signal.
10. A method of fabricating an optical waveguide, the method comprising the steps of:
    (a) bonding, by direct interfacial bonding, a guiding lamina (10) of optical material to a superstructure lamina of optical material;
    (b) modifying optical properties of regions of the guiding lamina so as to define a light guiding path along the guiding lamina;
    (c) removing material from the guiding lamina to reduce the thickness of the guiding lamina; and
    (d) bonding, by direct interfacial bonding, a further superstructure lamina to the guiding lamina.
11. A method according to claim 10, further comprising:
    before step (a), indiffusing and/or out-diffusing material to/from one face of the guiding lamina, that face being bonded to the superstructure lamina in step (a); and
    before step (d), indiffusing and/or out-diffusing material to/from the exposed face of the guiding lamina, that face being bonded to the further superstructure lamina in step (d).

* * * * *